Dec. 30, 1952     L. E. WATSON     2,623,304
MEANS FOR USE IN SELECTING AND MATCHING LIPSTICK
AND THE LIKE COLOR TONES TO SUIT LIP COLORINGS
Filed March 13, 1951
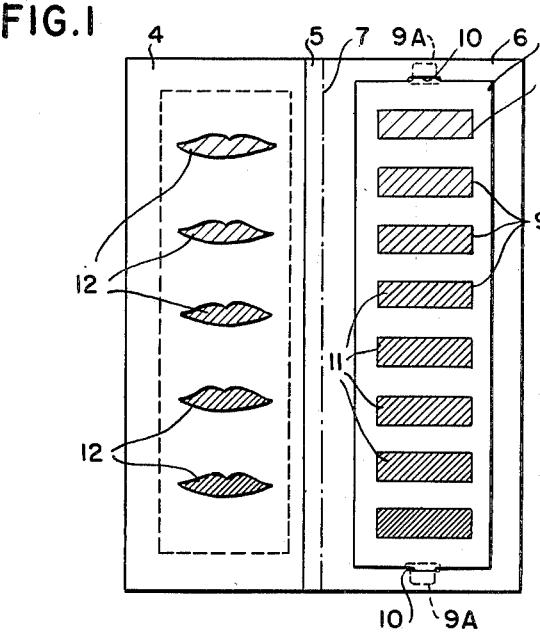
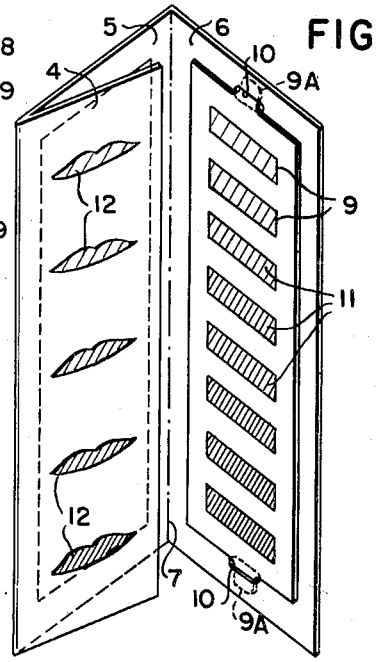
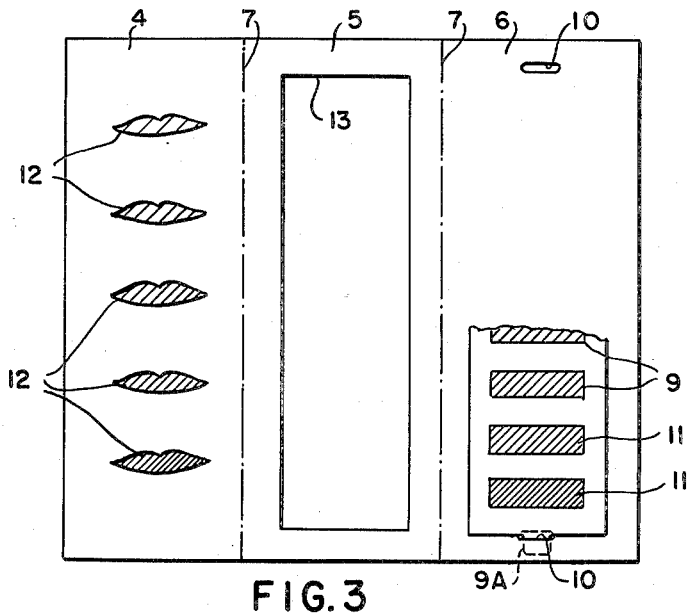
Lionel Edward Watson
*INVENTOR.*
BY
Richardson, David and Nordon
his ATTORNEYS Patented Dec. 30, 1952

2,623,304

UNITED STATES PATENT OFFICE 2,623,304

MEANS FOR USE IN SELECTING AND MATCHING LIPSTICK AND THE LIKE COLOR TONES TO SUIT LIP COLORINGS

Lionel Edward Watson, Rose Bay, near Sydney, New South Wales, Australia, assignor to Helena Rubinstein, Inc., New York, N. Y., a corporation of New York Application March 13, 1951, Serial No. 215,356
In Australia March 15, 1950

1 Claim. (Cl. 35—59)

This invention relates to means for use in selecting and matching lipstick and rouge and the like complexion colour values to suit individual lip and the like tonings.

The various forms of lipstick, rouge and the like are of a translucent nature and when correctly applied enhance rather than obscure the natural colour of the lips and the like. Various colour cards, charts, and the like are supplied by the manufacturer of such cosmetic articles, but do not furnish a true indication of the ultimate colour which is presented when such cosmetic preparation is applied to the lips or the like, and often the result is quite unsatisfactory, due to the fact that the superimposed lipstick or the like when combined with the natural colour of that lips or other portion on which it is embodied, presents a tone or shade different from that of the said preparation.

Now the present invention has been devised to provide means whereby a selected tone of lipstick or the like, can be tested with the natural lip colouring, and the tone combination, then presented can be viewed. By these means a series of tests can be made until the desired lipstick or the like tone is selected to match the individual natural colouring, and thereby furnishing a very useful service to the female sex, and the cosmetic trade generally.

According to this invention the means for use in selecting and matching colour tones of lipstick, rouge, and the like to suit individual requirements consist in the simplest form of a chart or the like containing a series of openings therein which are each covered by a sheet of material coloured to represent the tone or tint of a required range of lipstick or the like, in the natural translucent or part-transparent colourations in the actual lipstick or the like, so that when a person desirous of selecting a colour tone to suit her requirements registers her lips behind any one of the range of colour toned apertures of the chart or the like, and by viewing the resultant colour combination is enabled to make a selection suited to her requirement.

In another application of the invention two charts or the like are provided and one may be termed the cosmetic colour chart and the other the natural lip tone chart. The cosmetic colour chart has a series of the lipstick or other cosmetic colour tones represented thereon by means of the tinted translucent apertures before described, while the second or natural lip colour chart has a series of coloured portions thereon representing a range of natural lip colours. By selecting the natural lip colour approximating to that of the person making the selection, a preferred cosmetic toning on the first chart is then superimposed on the selected natural colour and the result viewed. By this described means colour combinations can be readily presented and viewed by this superimposing of the cosmetic tones on the natural lip colours and a selection made with the certainty that there will be no variation in the resultant colour combination when the selected lipstick or the like is applied to the person's lips.

In certain applications of the invention the two colour tone charts are formed in a folder or in any other manner, and in some cases the cosmetic tone chart may be detachable for use and replaceable.

In order to describe the invention more fully reference will now be made to the drawings accompanying and forming part of this complete specification and wherein:

Fig. 1 is an elevational view of a folder embodiment of the invention laid flat and partly opened.

Fig. 2 is a perspective view of the same, showing the opening out of the folder being effected, and Fig. 3 is an elevational view of such folder fully opened out and laid flat.

The folder as shown consists of three conjoined leaf or panel portions 4, 5, and 6 formed of stout paper cardboard or any other suitable material, adapted to fold along scored lines 7. The back panel 6 is adapted to receive the cosmetic colour chart 8 therein in a detachable manner as by means of end tabs 9A fitting through slots 10 in said panel 6.

This cosmetic colour chart 8 has a series of openings 9 formed therein in suitably spaced relationship and the number thereof is governed by the range of colour tones of the lipstick or the like, and each said opening is covered with a sheet of material coloured to represent a particular lipstick or other cosmetic preparation colour tone or tinting, of a range thereof, so that a series of coloured tones 11 are furnished. These colour tones 11 are of translucent or partly transparent form to present a colour effect similar to that of the article itself, and such colour tones may be formed by the said articles on transparent panels or strips fitted across the related openings 9. When the lipstick or the like is used there may be a protective transparent facing (not shown) fitted over the chart face or behind it according to which side the colour is applied.

Although these colour tone apertures 9—11 are shown of oblong form they may be of lip or any other desired shaping.

The colour tone apertures 9—11 are identified in any maner usual by the manufacturers of lipstick and the like products.

The leaf 4 has a series of representations thereon indicating natural lip colours 12, and they may be as shown in the form of lip shapes in outline, and depicted on the inside face or back or both, and form the second or natural lip tone chart. These colours may be identified in any suitable manner.

The medial leaf or panel 5 may have descriptive directions or the like thereon, or it may have a cut out portion 13 under which a mirror may be placed to permit a user to view her lips or the like to identify the nearest natural lip tone 12 to match her lip colouring, or a mirror may be fitted on such panel 5.

In some embodiments of the invention these natural lip colours may be formed as translucent coloured strips or the like fitted across apertures in similar manner to those of the colour tone apertures 9—11; and the said natural lip colours may be registered with any one of the said colour tone apertures and held against the light to show the colour combination in a more effective manner. In this latter regard the panel 4 may be folded back onto the panel 5 over the cut out portion 13 and the particular tone of the colour tone chart 8 brought into register and viewed against the light.

The invention may be applied in many other ways and is not limited to the precise applications described above.

I claim:

A device for use in selecting and matching lipstick and the like coloured tones, to suit lips, complexion colourings and the like, comprising a folder formed with three joined panels, a chart detachably carried by an outer panel and having a plurality of openings, a translucent covering for each of said openings, each translucent covering having a particular colour tone of a range of lipstick and the like colourings, a second chart containing natural lip colours at spaced intervals carried by the outer panel, said other outer panel being adapted to be folded inwardly upon the intermediate panel and said first outer panel being adapted to be folded inwardly upon said other outer panel overlying said intermediate panel so that the first chart registers with the second chart to present a resulting colour combination, and said intermediate panel having an opening for the inspection of said resultant colour combination.

LIONEL EDWARD WATSON.

REFERENCES CITED

The following references are of record in the file of this patent:

UNITED STATES PATENTS

| Number | Name | Date |
| --- | --- | --- |
| 799,609 | Ludwig | Sept. 12, 1905 |
| 1,032,156 | Pearson | July 9, 1912 |
| 1,979,119 | Radzinsky | Oct. 30, 1934 |
| 2,085,180 | Bevis | June 29, 1937 |
| 2,374,389 | Snyder | Apr. 24, 1945 |
| 2,409,285 | Jacobson | Oct. 15, 1946 |
| 2,462,606 | Brodeur | Feb. 22, 1949 |

FOREIGN PATENTS

| Number | Country | Date |
| --- | --- | --- |
| 18,147 | Great Britain | Aug. 6, 1909 |
| 202,527 | Switzerland | June 16, 1939 |
| 832,452 | France | Sept. 28, 1938 |